United States Patent [19]

Willard et al.

[11] Patent Number: 4,803,487

[45] Date of Patent: Feb. 7, 1989

[54] PORTABLE COMMUNICATIONS RECEIVER WITH SEPARATE INFORMATION PRESENTATION MEANS

[75] Inventors: David F. Willard, Plantation; Philip P. Macnak, West Palm Beach, both of Fla.

[73] Assignee: Motorola, Inc., Schaumburg, Ill.

[21] Appl. No.: 44,875

[22] Filed: Apr. 30, 1987

[51] Int. Cl.⁴ .............................................. H04Q 7/00
[52] U.S. Cl. .............................. 340/825.440; 455/11; 455/8; 379/296
[58] Field of Search ............... 340/825.44, 825.48, 340/825.49; 455/88, 89, 70, 11; 375/3; 379/170-175, 61, 57, 56, 296; 455/11; 370/94

[56] References Cited

U.S. PATENT DOCUMENTS

| | | | |
|---|---|---|---|
| 3,937,004 | 2/1976 | Natori et al. | 340/825.44 |
| 3,984,807 | 10/1976 | Haemmig | 375/3 |
| 3,986,119 | 10/1976 | Hemmer, Jr. et al. | 455/89 |
| 4,172,969 | 10/1979 | Levine et al. | 340/825.44 |
| 4,539,706 | 9/1985 | Mears et al. | 455/11 |
| 4,649,385 | 3/1987 | Aires et al. | 340/825.49 |
| 4,713,808 | 12/1987 | Gaskill et al. | 370/94 |

*Primary Examiner*—Donald J. Yusko
*Attorney, Agent, or Firm*—Michael J. DeLuca; Vincent B. Ingrassia; Anthony J. Sarli, Jr.

[57] ABSTRACT

A personal message receiving apparatus is described including a portable communications receiver, intended to be carried by the user, which receives, detects and stores messages transmitted on a first radio frequency communication channel. The stored message is then subsequently transmitted over a second communications channel to a presentation unit having a second receiver which is intended to be carried by the user. The second receiver receives, and detects the message, and presents the message to the user in the form of a visual display. The message may also be stored.

40 Claims, 8 Drawing Sheets

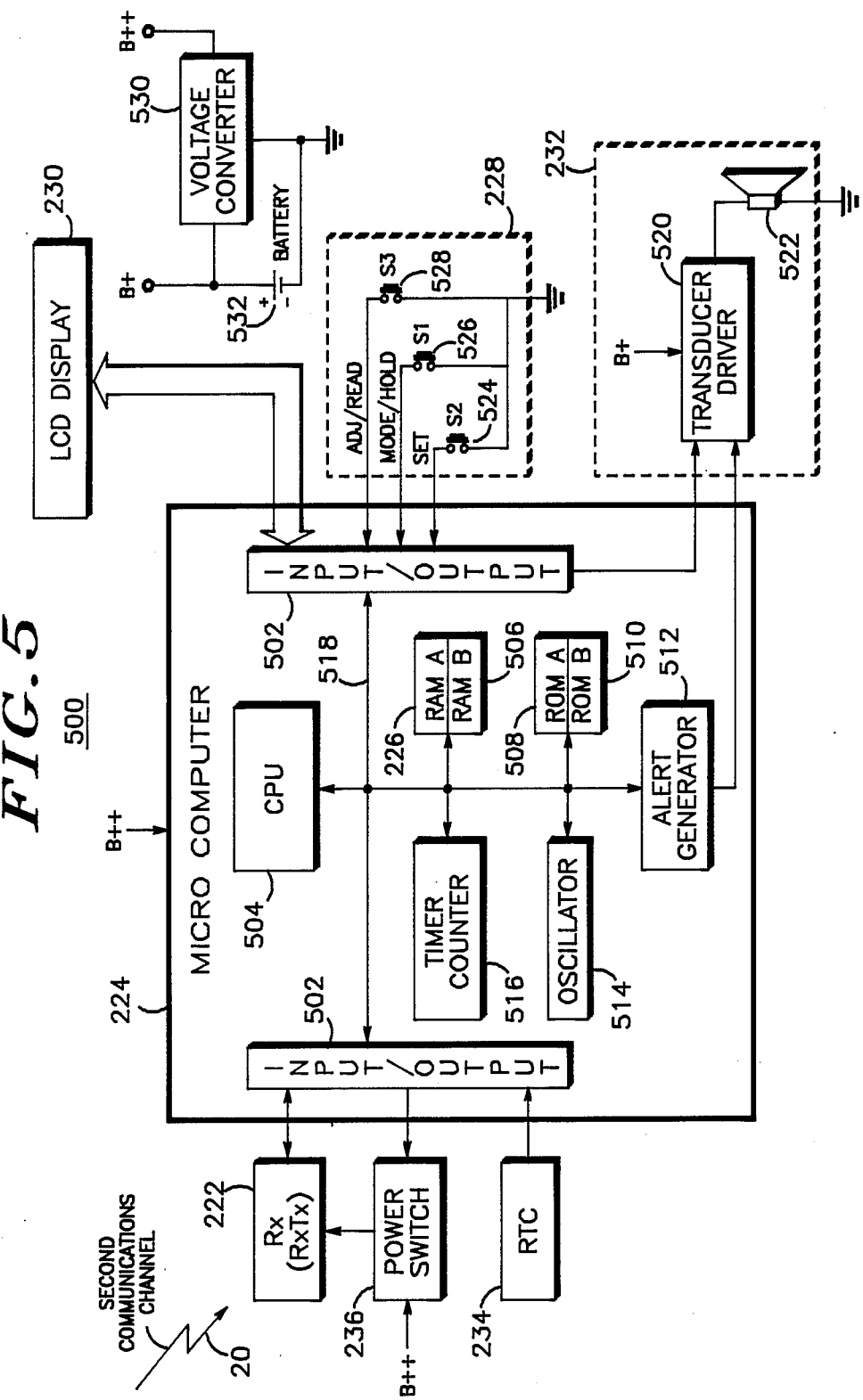

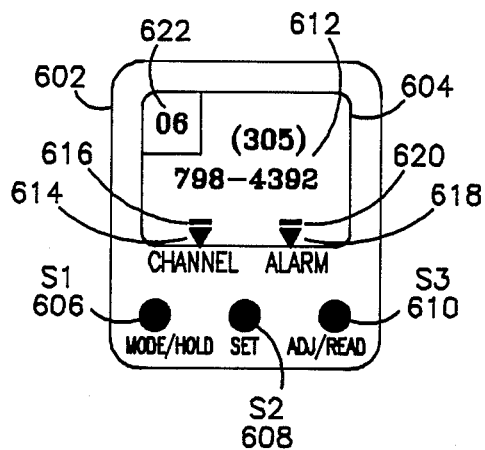

FIG. 6

ANNUNCIATOR DEFINITION TABLE

| CHANNEL | DESCRIPTION |
|---|---|
| ▼ (SOLID) | THE CHANNEL IS OPERATING PROPERLY, THE SECONDARY UNIT IS RECEIVING SIGNALS FROM THE PRIMARY UNIT. |
| ▼ (FLASHING) | THE SECONDARY IS NOT RECEIVING SIGNALS FROM THE PRIMARY UNIT, THE USER MUST RE-ESTABLISH THE CHANNEL. |
| ▼ (FLASHING) | THE SECONDARY UNIT IS IN THE CHANNEL RE-SET MODE AND IS WAITING TO RECEIVE A SIGNAL FROM THE PRIMARY UNIT. |
| ALARM | DESCRIPTION |
| ▼ | THE ALARM ANNUNCIATORS OPERATE THE SAME AS IN PRESENT WATCHES. THE BOTTOM ANNUNCIATOR INDICATES THAT AN ALARM HAS BEEN SET AND A FLASHING TOP ANNUNCIATOR INDICATES THAT THE UNIT IS IN THE ALARM SET MODE. |

FIG. 7

PORTABLE COMMUNICATIONS RECEIVER WITH SEPARATE INFORMATION PRESENTATION MEANS

FIELD OF THE INVENTION

This invention relates to radio communications receivers in general, and more particularly to portable radio communications receivers having means separated from the receiver for the presentation of the received information.

BACKGROUND OF THE INVENTION

Numerous portable radio communications receivers are currently available which include means for the presentation of information, such as voice messages, phone numbers or other information. One such portable radio communications receiver having either a display for the presentation of information received over a radio communications channel, or audio circuits for the presentation of received voice messages, is the radio paging receiver. Radio paging receivers, or pagers as they are often called, utilize selective call signalling to direct messages to both individual pagers and groups of pagers. This is accomplished by transmitting uniquely coded tone or digital signals, called addresses, which are used to identify each individual pager, followed by the transmission of the message, either a voice message or encoded data message.

In the case of a pager receiving data messages, the pager to which the message is directed generally stores the message and responds with an audible alert indicating a message has been received. A display, which may be located on the top, the front, or the side of the pager, is used to present the message. Switches or pushbuttons are provided for controlling the operation of the pager by the user, as for example to reset the audible alert or to recall a stored message for review. Depending on the design of the pager and the display location, a pager is generally more suited to be worn on the belt or carried in the shirt pocket. Some pagers may be worn comfortably in either position, although access to the pager controls and viewing of the display will be compromised. Even when the pager is worn in the intended position, the display is often difficult to view without removing the pager and repositioning it to view the display.

Various proposals have been made to overcome the difficulties of viewing the display. One such proposal is that of the "pager-watch", wherein the receiver and display electronics are included in a compact wrist worn configuration. However, this approach, while it may solve the problem of viewing the display, creates several new problems. Foremost among these are problems relating to battery life and receiver sensitivity.

Currently available paging receivers require a substantial battery to power the receiver and decoder electronics in order to provide acceptable battery life. Battery saving circuits are generally employed to reduce the overall power drain of the receiver electronics. Newer technologies, such as microprocessors are being used to integrate a variety of functions, such as those associated with decoding and message presentation to further minimize power consumption. However, none of these methods has been able to impact the size of the battery sufficiently to reduce the size of the pager to the point where the pager may be more conveniently worn by the user and still maintain a battery life equivalent to a conventional pager.

Receiver sensitivities are often dictated by the design of the antenna especially where the size of the pager limits the size of the antenna which may be incorporated. Because of the limited space in which to provide an antenna, especially when located internally in the case of the "pager watch", it will be appreciated by one skilled in the art that the "pager watch" receiver sensitivity will be substantially less than that of a belt or shirt pocket pager.

SUMMARY OF THE INVENTION

It is therefore an object of the present invention to provide a portable communications receiver which provides convenient presentation of messages.

It is a further object of the present invention to provide a portable communications receiver which utilizes a separate presentation unit for the display of received data messages.

It is a further object of the present invention to provide a portable communications apparatus which does not compromise either battery life or receiver sensitivity while maintaining reliable reception of messages.

A personal communications device is described which is comprised of a first receiver means for receiving and detecting messages being transmitted on a first communications channel. Transmitter means, coupled to the first receiver means, transmits the messages received on the first communications channel on a second communications channel. A second receiver means, separated from the first receiver means, receives and detects the messages transmitted on the second communications channel and presents to the user the message on a presentation means. The received messages are stored in the first receiver means and are also stored in the second receiver means. The first receiver means may be worn on the body, and the second receiver means may be worn on the wrist.

These and other objects and advantages of the present invention will become apparent to those skilled in the art upon consideration of the following description and accompanying drawings of the present invention.

BRIEF DESCRIPTION OF THE DRAWINGS

The features of the present invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements, in which and wherein:

FIG. 5 is a diagram of the second receiver means implemented using a microprocessor for the preferred embodiment of the present invention.

FIG. 6 is a pictorial or face view of the wrist worn presentation unit in the preferred embodiment of the present invention.

FIG. 7 is a table describing the annunciator functions of the wrist worn presentation unit in the preferred embodiment of the present invention.

DESCRIPTION OF THE PREFERRED EMBODIMENTS

Figure 1:
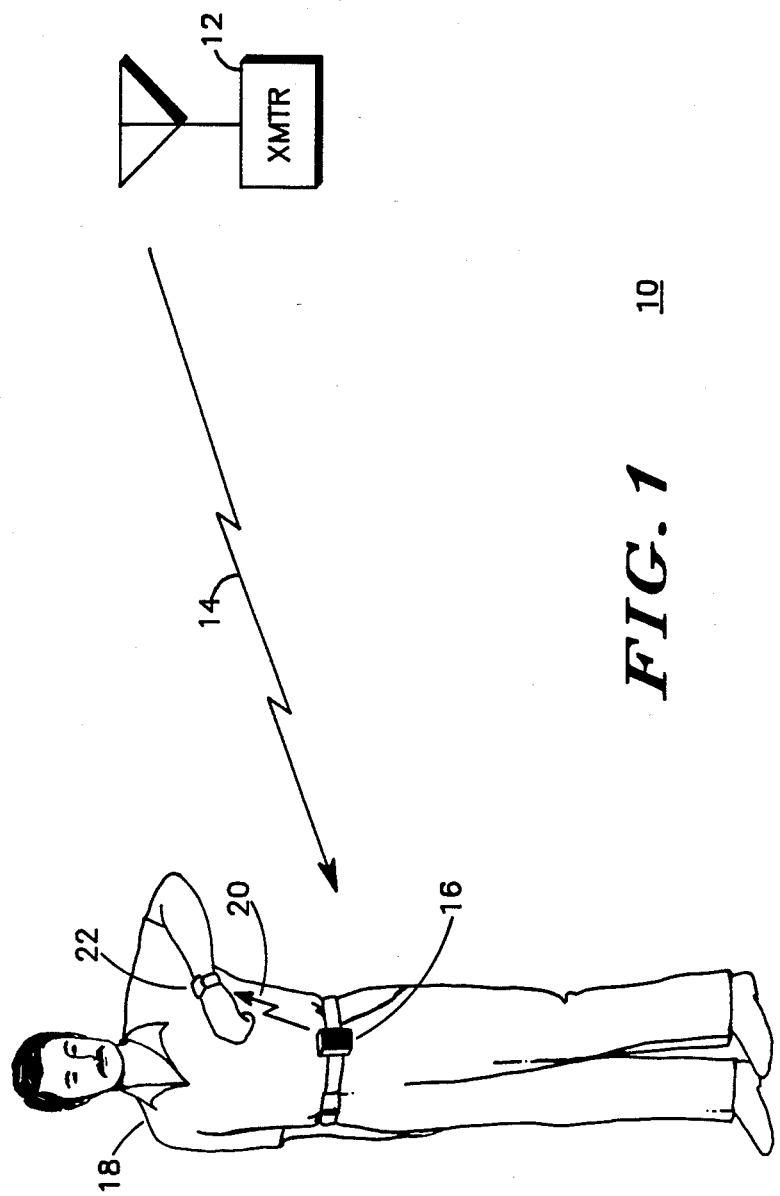
FIG. 1 is diagram showing an application of the preferred embodiment of the present invention.

Reference is now directed to the drawings, and more particularly to FIG. 1, which shows a typical diagram of a communications system 10 incorporating the preferred embodiment of the present invention. As shown in FIG. 1, a communications transmitter 12 transmits selective call messages, or pages, on a first communications channel 14 to a portable radio communications receiver, or pager 16. It will be appreciated that communications system 10 need not be limited to a single transmitter as shown, but may include communications systems with multiple transmitters as well.

The transmitted selective call messages include addresses identifying the pager to which the messages are directed The addresses are generally followed by voice or data messages One or more of these transmitted selective call messages may be directed to pager 16 as shown in FIG. 1. Pager 16, in this case, is carried on the belt of user 18. It will be appreciated that pager 16 may be carried in other locations equally as well, such as in a shirt or pants pocket, or in a purse. The transmitted selective call messages are received and detected by pager 16. The addresses are decoded in a manner well known to those skilled in the art, and those addresses directed to pager 16 result in data messages being stored and a sensible alert, which may be audible or tactile, being generated. When voice messages are transmitted, which follow the address, the sensible alert is first generated followed immediately by the voice message.

The voice or stored data message is than retransmitted using a low power transmitter located in pager 16 on a second communications channel 20 to a separate wrist worn message presentation unit 22. Second communications channel 20 in the preferred embodiment is a low power FM signal, although other forms of non-wire communications, such as ultrasonic and infrared signals, or other radio frequency signals as low power AM, could be used equally as well.

The messages transmitted on second communications channel 20 are received and detected by presentation unit 22. The messages received are then presented to user 18 as a visual display for data messages or audibly for voice messages. By locating presentation unit 22 on the wrist, user 18 can readily respond to the received message by repositioning the presentation unit 22 to a position which allows convenient viewing or listening of the received messages. It will also be appreciated that presentation unit 22 may take other forms as well, such as bracelets, pendants, necklaces or the like, which can perform the same function of allowing convenient viewing or listening of the received messages.

Figure 2:
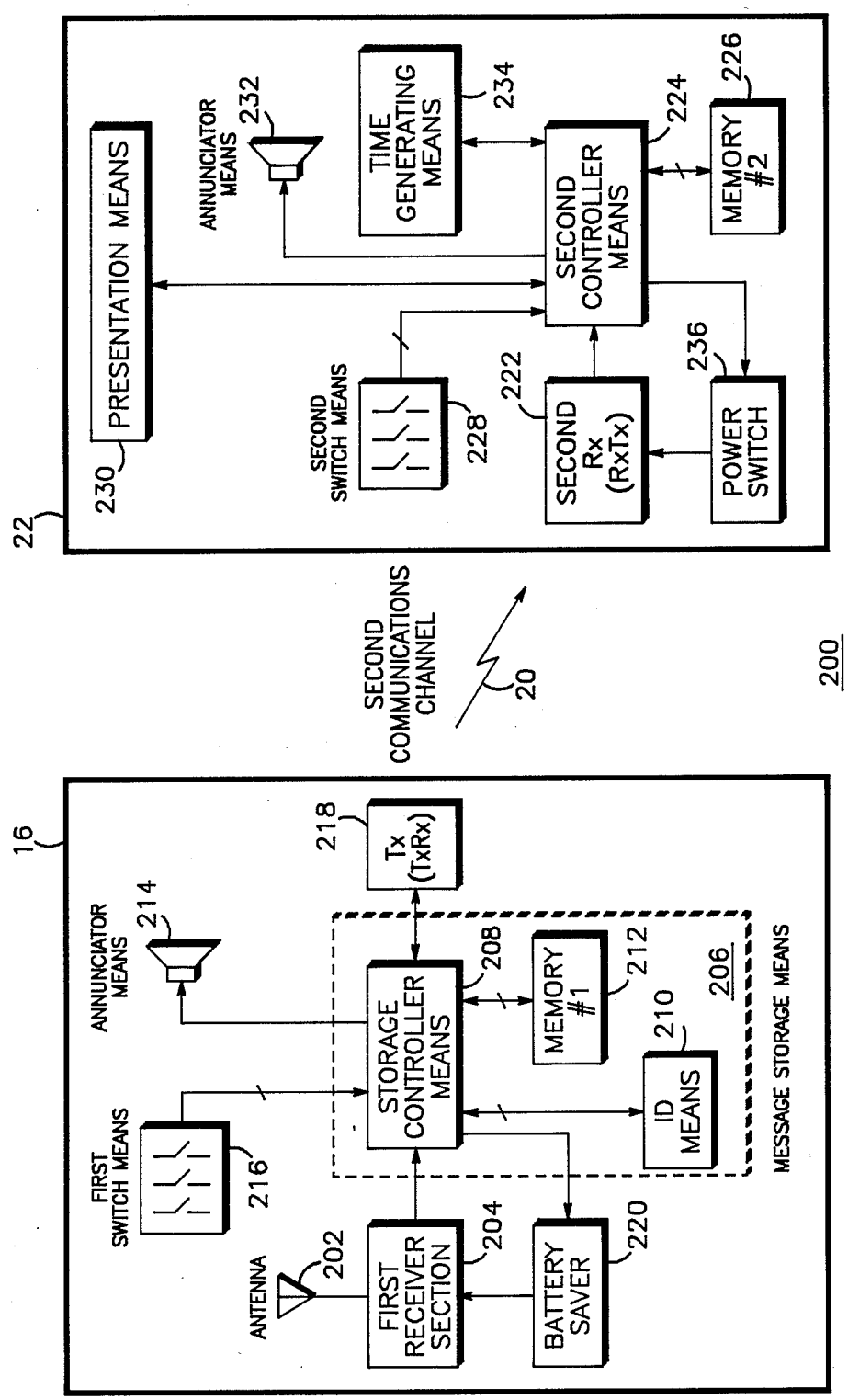
FIG. 2 is a functional block diagram of the apparatus of the present invention.

Reference is now directed to FIG. 2 which shows a functional block diagram of the apparatus 200 comprising the preferred embodiment of the present invention. Pager 16 of FIG. 1 includes first receiver means which consists of a first receiver section 204 and antenna 202, capable of receiving the selective call messages transmitted on first communications channel 14. The output of first receiver section 204 is a demodulated signal which includes the selective call addresses and associated voice or data messages. The output of first receiver section 204 couples to message storage means 206 which provides selective call decoding functions, and controls message storage and retransmission of stored messages on the second communications channel 20 to second receiver means 22, which corresponds to presentation unit 22 of FIG. 1.

Message storage means 206 consists of storage controller means 208, identification (ID) means 210 and memory #1 or first memory means 212. Identification means 210, consists of a read-only memory, such as an EEPROM (electrically erasable programmable read only memory), which stores one or more predetermined addresses identifying those messages to which first receiver means 16 will respond. Storage controller means 208 provides the decoding function, in a manner well known to those skilled in the art, by comparing the received addresses with the stored predetermined addresses. When any of the received addresses match those stored in identification means 210, storage controller means 208 stores the subsequently received data message in first memory means 212. A sensible, audible or tactile, alert is then delivered by annunciator means 214 indicating a message has been received. In the preferred embodiment of the present invention, first memory means 212 is a random access memory capable of storing multiple messages. Storage controller means 208 also formats the stored messages in a serial fashion for transmission by transmitter 218 to second receiver means 22.

First receiver means 16 also includes switch means 216, consisting of manually actuatable switches, for controlling first receiver means 16 functions, such as ON/OFF, RESET and TRANSMIT. The ON/OFF function turns first receiver means 16 power on and off. The RESET function allows manual reset of the sensible alert prior to an automatic time out period, such as eight seconds. The TRANSMIT button allows a data message which has been stored in first receiver means 16 to be retransmitted. Multiple actuations of the TRANSMIT button allows transmitting the current message, as well as previously received messages to second receiver means 22 where they may be readily viewed.

As previously stated, second communications channel 20 is a low power FM signal in the preferred embodiment, linking transmitter 218 located in first receiver means 16, and second receiver section 222 located in second receiver means 22. FSK modulation is used in the preferred embodiment, although other modulation methods can be used as well. The low power FM transmitter can be designed to operate on any of the unlicensed frequencies authorized by the FCC, Part 15, Section 15.101, eliminating the need to separately license the wrist worn presentation unit.

The output of second receiver section 222 is a serial stream of information corresponding to the serially transmitted data messages, or an analog signal corresponding to the voice messages. The output of second receiver section 222 couples to second controller means 224, which controls the storage of the received data messages in memory #2, or second memory means 226. Second memory means 226 is preferably a random access memory providing storage for at least one data message. Second controller means 224 also controls the delivery of the received voice and data messages by presentation means 230 or annunciator means 232.

Time generating means 234 couples to second controller means 224 and provides watch functions, such as time, day and date which are displayed on presentation means 230 when data messages are not being presented. Annunciator means 232 couples to second controller means 224 and provides a sensible alert, either audible or tactile, for indicating a message has been received and stored. Audible alarm functions for time keeping means 234 are also provided by annunciator means 232.

Second switch means 228, consisting of manually actuatable switches, couples to second controller means 224 and provides control of time generating means 234, such as setting the time or alarm. Second switch means 228, also provides control of message presentation, such as recall of the data message stored in second memory means 226, and reset means for resetting the audible alerts provided by annunciator means 232.

In order to conserve battery drain, first receiver means 16 includes a battery saver circuit 220. The operation of battery saver circuit 220 as used in a conventional paging receiver is well known to those skilled in the art.

It will be appreciated by those skilled in the art that from the description of the preferred embodiment of the present invention already provided, first receiver means 16 is constructed in a manner somewhat similar to a conventional paging receiver. Consequently, excellent receiver sensitivity, immunity to falsing, and reliable voice and data message reception are obtainable as in a conventional paging receiver. The battery used to power first receiver means 16 provides battery life at least as good as conventional paging receivers, given the high current requirements of a quality communications receiver. By storing all received data messages in first memory means 212, the user is insured all messages directed to him/her are available for review. Even when the transmission to second receiver means 22 is corrupted, such as by blocking either transmitter 218 transmission or separate wrist worn receiver 22 reception, data messages are recoverable by simply recalling the last message received as previously described. An indication is provided by the separate wrist worn receiver when loss of message occurs which will be described in detail shortly.

It should also be noted, that a certain amount of redundancy is built into the preferred embodiment of the present invention. This is particularly true with respect to first annunciator means 214 and second annunciator means 232. By means of first switch means 216 and second switch means 228, the user can select the alert to be delivered from only one annunciator or both. Since the volume producible by first annunciator means 214 is greater than that deliverable by second annunciator means 232, first annunciator means 214 may be selected when ambient noise levels are high, and second annunciator means 232 may be selected when ambient noise levels are low, as an example.

In the preferred embodiment, second receiver means 22 is constructed to minimize current drain requirements. Current drain is further minimized by using a synchronous data message transmission on the second communications channel.

Figure 3:
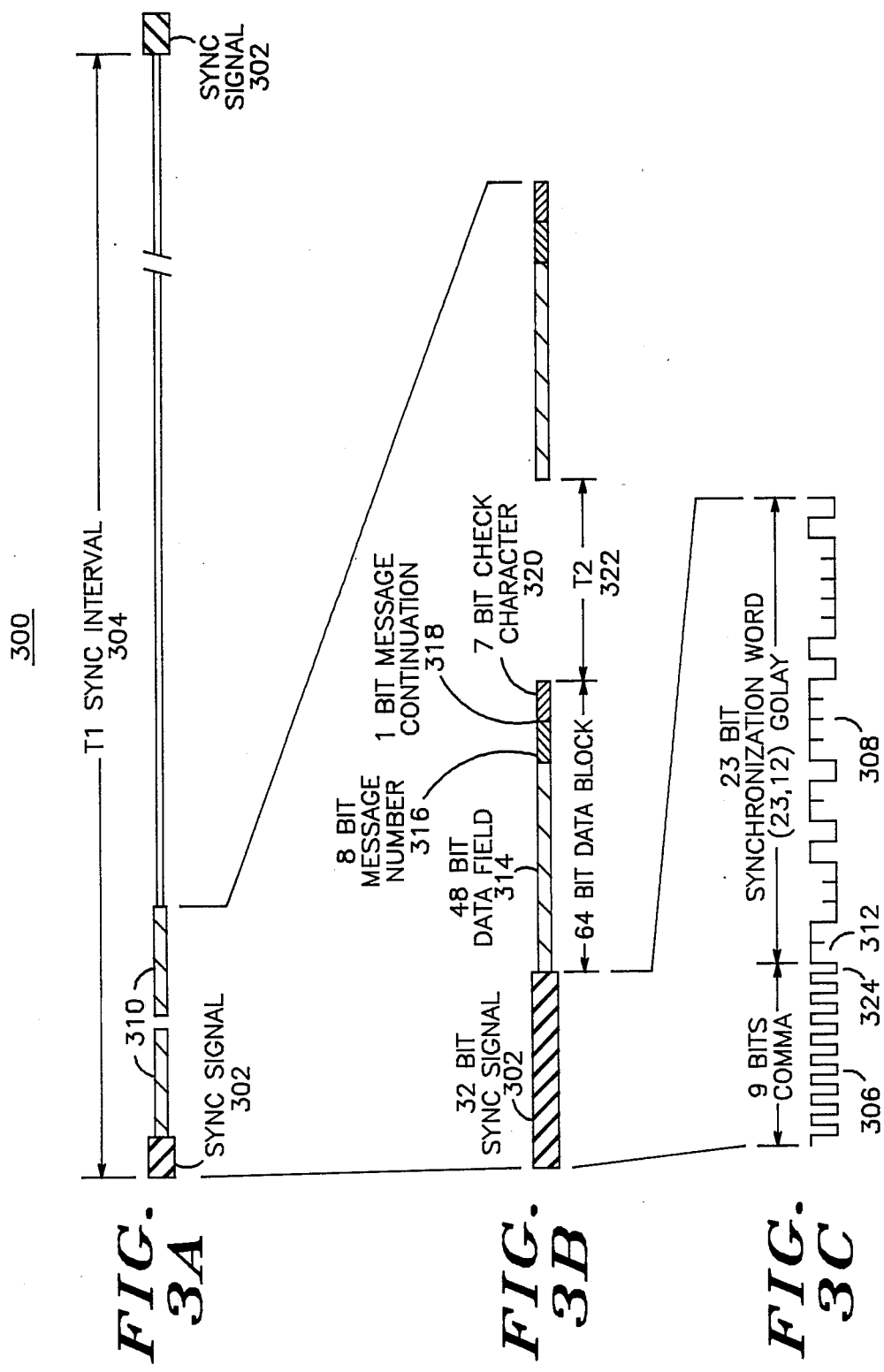
FIG. 3A to 3C are diagrams of the synchronous signalling format utilized in the preferred embodiment of the present invention.

Reference is now directed to FIGS. 3A–3C which show diagrams of the synchronous signalling format 300 employed in the present invention. The signalling format 300 shown is an adaptation of the Golay Sequential Code (GSC) format widely used by the assignee of the present invention for non-synchronous data transmission. The GSC format has been adapted for use in a synchronous system in the preferred embodiment of the present invention. It will be appreciated that other signalling formats, such as the POCSAG signalling format which is a synchronous signalling format, could also be adapted without departing from the scope or spirit of the present invention.

As shown in FIG. 3A, synchronization signal 302 is transmitted once during a periodically generated time interval 304, which in the preferred embodiment of the present invention is sixty seconds. It will be appreciated by one skilled in the art that this time interval can be longer or shorter without departing from the scope or spirit of the present invention.

Data messages are transmitted on first communications channel 14 using conventional synchronous or asynchronous signalling formats which are well known to one skilled in the art. It will be appreciated that data messages could be received during time interval 304 when second receiver means 22 is not responsive to receiving the data messages. So as to avoid confusion, the alerting signal normally generated by first receiver means 16 upon receipt of the data message over first communications channel 14 is delayed until the data message has been transmitted to second receiver means 22. Time interval 304 is selected to maximize battery life while maintaining an acceptable time delay from receipt of a data message by first receiver means 16 to presentation of the data message by second receiver means 22. At sixty seconds for time interval 304, the average delay from receipt of a data message to presentation of the data message is approximately thirty seconds. The data messages are transmitted following synchronization signal 302, one or more data blocks 310 may be transmitted, as shown in FIG. 3A. Data messages are also transmitted after actuation of the TRANSMIT switch by the user, retransmitting the previously stored message. Since data message transmission occurs only a relatively small number of times each day, most transmissions include only synchronization signal. As in conventional synchronous transmission systems, second receiver section 222 is powered for a time long enough to receive both the synchronization signal and at least the first data block.

As shown in FIG. 3C, synchronization signal 302 consists of nine bits of comma 306 and a twenty-three bit synchronization word 308, which is common to all second receiver means 22. The transmission rate for synchronization word 308 and data block 310 is 600 bits per second, although other data rates could be used equally as well. Comma 306 is an alternating one-zero pattern transmitted at twice the bit rate of synchronization word 308 for a time period equivalent to nine data bits. Synchronization word 308 is a single 23,12 Golay coded word. The last bit 324 of comma 306 is always of opposite phase to the first bit 312 of synchronization word 308, as shown in FIG. 3C.

Comma 306 is generated before synchronization word 308 for two purposes. Comma 306 insures that when second receiver means 22 begins receiving the synchronization signal, uncorrelated data is initially received, thereby insuring proper decoding of synchronization word 308. In the preferred embodiment of the present invention the decoding of synchronization word 308 is accomplished using a "block" decoder. Such a decoder is described in U.S. Pat. No. 3,801,956 to Braun et al, entitled "Digital Sequence Detector Using Multiple Samples During Each Digit Time Period" which is assigned to the assignee of the present invention and which is incorporated for reference herein. The "block" decoder provides synchronization of second receiver means 22 with first receiver means 12 without the requirement for bit synchronization employed in most synchronization systems. In addition, the nine bits of comma 306 allow for timing differences between first receiver means 16 and second receiver means 22 clocks. In the preferred embodiment of the present invention, this timing difference is approximately plus or minus four and one-half bits for a system clock stability of 120 ppm over time interval 304.

Following synchronization signal 302 is a sixty four bit data block 310, shown in FIG. 3B, consisting of a forty-eight bit data field 314, an eight bit message number 316, a single message continuation bit 318, and a seven bit check block 320. Depending upon the type of data message transmitted, it will be appreciated that data field 314, as described consisting of forty-eight bits, may contain different data formats, such as twelve four bit BCD blocks for numeric only characters, or six eight bit ASCII blocks for alphanumeric characters. Because of the short distance for transmission between first receiver means 16 and second receiver means 22, and the ability to retransmit a message if it is corrupted in transmission, the data message is transmitted without any special error correction. As will be described in detail shortly, a check block 320 is provided which can indicate when a message is corrupted, and should be retransmitted.

Since first memory means 212 is capable of storing multiple data messages, message number 316, shown in FIG. 3B, is used to identify the number of the currently displayed data message. This information is useful for a variety of reasons, such as an indicator of a missed or unread message when the number changes by two or more since the last received data message. Message number 316 also indicates when first memory means 212 "rolls over", and new messages begin overwriting the earliest previous messages. Message number 316 also ensures to the user that messages which are longer than a single display due to a continuation are combined to a single data message.

Message Continuation bit 318, shown in FIG. 3B, is included to identify data messages transmitted which are longer than twelve numeric characters, or six alphanumeric characters, as previously described. In the preferred embodiment of the present invention, message continuation bit 318 is a "0" when data message continuation is not required, and a "1" when a message continuation will occur. It will be appreciated, multiple continuations of a data message can be allowed, limited only by the amount of memory provided to store the incoming data messages. When data messages are longer than one data block in length, a second time interval 322 is provided between data blocks. This time interval allows time to verify the previous data block was transmitted correctly and stored before the next data block is received. It will be appreciated, the length of time interval 322 is a matter of design choice, and depending upon operation may not be utilized.

Check character 320, shown in FIG. 3B, provides an overall check of data block 310. Check character 320 provides a convenient means of indicating data messages transmitted between first receiver means 16 and second receiver means 22 have not been corrupted in transmission. As messages are received, second receiver means computes the value of check character 320. If this value does not match the transmitted value of check character 320, the data message transmitted has been corrupted, and an error message is presented on the display of second receiver means 22, indicating to the user that he should actuate the TRANSMIT switch on first receiver means 16 retransmitting the received data message.

It will be appreciated by one skilled in the art that the size of data block 310, the size of data field 314, the size and format of message number 316, and the size and format of check block 320 are a matter of design choice. Consequently, changes in the size of any of the blocks to allow more or less characters to be transmitted, and changes to the format of the transmission of the information, may be made without departing from the scope or spirit of the preferred embodiment of the present invention.

Figure 4:
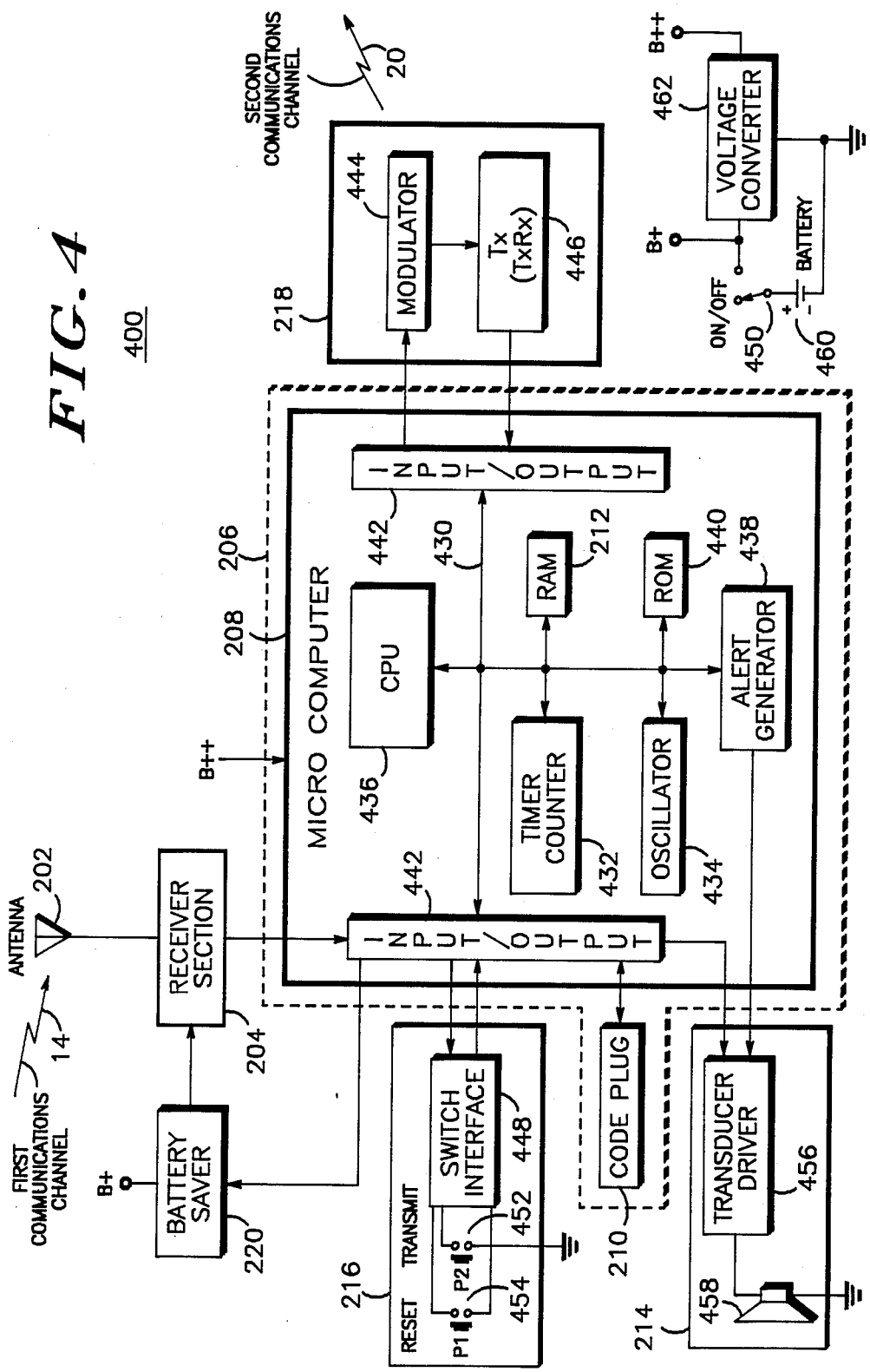
FIG. 4 is a diagram of the first receiver means implemented using a microprocessor for the preferred embodiment of the present invention.

Reference is now directed to FIG. 4 which shows the preferred embodiment of the apparatus 400 utilizing a microcomputer implementation for first receiver means 16. Antenna 202 and receiver 204, corresponding to first receiver section 204 of FIG. 2, receives and detects data messages transmitted on first communications channel 14. The output of receiver 204 connects to message storage means 206 which consists of storage controller means or microcomputer 208, identification means or code plug 210 and first memory means or RAM 212.

Microcomputer 208 is a single chip microcomputer, such as the MC68HC05L6 manufactured by Motorola. As shown in FIG. 4, microcomputer 208 includes a CPU 436 for operational control. An internal bus 430 connects all the elements of microcomputer 208. I/O port 442 (shown split in the figure) provides communications to the circuits external to microcomputer 208. A Timer Counter 432 is used to generate timing intervals, such as required for battery saver operation on the first communications channel, or synchronization signal generation. Oscillator 434 provides the reference frequency for operation of CPU 436. RAM 212 is used as temporary storage of program variables, and also provides storage for the received data messages. It will be appreciated by those skilled in the art, that additional RAM, external to the microcomputer may be added to provide additional message storage space. ROM 440 contains the firmware controlling microprocessor 436 operation. Programs, such as for decoding, battery saver operation, synchronization signal generation and message transmission, are stored in ROM 44. An alert generator 438 provides the alerting signal in response to decoding the address information.

Power for the apparatus 400 is preferably provided by a single cell battery 460. An ON/OFF switch 450, corresponding to part of first switch means 216 of FIG. 2, allows the user to turn power on and off to the unit. A voltage converter 462 steps up the output voltage from battery 460 to a voltage level sufficient to power microcomputer 208, such as 3.0 volts. Any other circuit elements which may require the higher operating voltage are also supplied from the output of voltage converter 462. It will be appreciated that while the preferred embodiment only operates from a single battery, multiple batteries could be provided, which would also eliminate the need for voltage converter 462.

As shown in FIG. 4, first switch means 216 further comprises a manually actuatable RESET switch 454 and a TRANSMIT switch 452. A switch interface 448 provides the electronics necessary to couple the switches to I/O port 442. RESET switch 454 allows manual reset of the sensible alert generated after a message has been received and prior to an automatic time out period, such as eight seconds. If the pager is capable of receiving voice messages, RESET switch 454 can also be used to monitor the first communications channel.

TRANSMIT switch 452 allows a data message which has been stored in RAM 212 memory to be retransmitted over the second communications channel. A single actuation of TRANSMIT switch 254 allows transmitting the current message, and repeated actuations thereafter allow transmitting previously received messages as well.

As will be described in detail shortly, there will be times when synchronization between the two units must be restored. When this is required, the user by actuating and holding RESET switch 454 and then momentarily actuating TRANSMIT switch 452 places the pager into the channel acquisition mode, required to initialize synchronization between the two units.

Annunciator means 214 is shown to comprise transducer driver 456 and transducer 458. In response to a data message being received, alert generator 438 generates an audible alert frequency, such as 3 KHz. The output of alert generator 438 couples to transducer driver 456 as well as an output from I/O port 442. I/O port 442 controls the delivery of the alerting signal providing such functions as silent alert operation, i.e. inhibiting the delivery of the alerting signal, and an interrupted alert signal output. The alerting signal is delivered to the user by transducer 458.

Data messages that have been received and stored are transmitted over second communications channel 20 by first transmitter means 218 which is comprised of a modulator 444 and a transmitter 446. Depending upon the format of second communications channel 20, transmitter 446 may deliver the signal to an antenna, as in the case of a radio frequency transmission; a transducer, as in the case of an ultrasonic transmission; or a light emitting diode, as in the cases of an infrared transmission.

Microcomputer 208 controls battery saving operation in a manner well known to one skilled in the art by periodically generating a control signal delivered from I/O port 442 to battery saver circuit 220. Battery saver circuit 220, in turn, controls the supply of power to receiver section 204, thereby minimizing the power consumption.

Reference is now directed to FIG. 5 which shows the apparatus 500 corresponding to second receiver means 22 which is implemented using a microprocessor. The messages transmitted over second communications channel 20 are received by receiver 222, corresponding to second receiver means 222 of FIG. 2. The output of receiver 222 of FIG. 5 is a serial stream of information corresponding to the serially transmitted data message. The output of receiver 222 couples to I/O port 502 of microcomputer 224, which corresponds to second controller means 224 of FIG. 2. Microcomputer 224 is a single chip microcomputer, such as the MC68HC05L6 manufactured by Motorola. Microcomputer 224 includes a CPU 504 for operational control. An internal bus 518 connects all the elements of microcomputer 224. I/O port 502 (shown split in the figure) provides communications to the circuits external to microcomputer 224. A Timer Counter 516 is used to generate timing intervals, such as required for synchronization with first receiver means 16.

Oscillator 514 provides the reference frequency for operation of CPU 504. The oscillator frequency is established by an externally connected crystal (not shown). Depending upon the frequency of operation desired, the oscillator frequency may be derived from an output of a real time clock (RTC) 234, thus requiring only a single crystal for both RTC 234 and CPU 504.

RAM A 226 is used as temporary storage of program variables, and also provides storage for the received data messages. It will be appreciated by those skilled in the art, that additional RAM, external to microcomputer 224 may be added to provide additional message storage space. ROM A 508 contains the firmware controlling microprocessor 224 operation. Programs, such as for synchronization, message reception, check character calculation and message presentation are stored in ROM A 508. An alert generator 512 provides the alerting signal in response to receiving a complete data message over second communications channel 20.

Power for apparatus 500 is provided by a single cell battery 532. A voltage converter 530 steps up the output voltage from battery 532 to a voltage level sufficient to power microcomputer 224 such as 3.0 volts. Any other circuit elements which may require the higher operating voltage are also supplied from the output of voltage converter 530. It will be appreciated that while the preferred embodiment only operates from a single battery, multiple batteries could be provided, which would also eliminate the need for voltage converter 530.

Synchronization circuit 236 couples to receiver section 222 controlling the power delivered to receiver section 222. Microcomputer 224, through I/O port 502 controls when synchronization circuit 236 delivers power to receiver section 222. Power is delivered, as previously described, during the time the synchronization signal is present, and for an additional period of time when data messages are transmitted.

As shown in FIG. 5, second switch means 228 comprises a manually actuatable SET switch 524 and a MODE/HOLD switch 526, and an ADJ/READ switch 528. Switches 524, 526 and 528 couple to I/O port 502.

Annunciator means 232 is shown to comprise transducer driver 520 and transducer 522. In response to a data message being received, alert generator 512 generates an audible alert frequency, such as 3 KHz. The output of alert generator 512 couples to transducer driver 520 as well as an output from I/O port 502. I/O port 502 controls the delivery of the alerting signal providing such functions as silent alert operation, i.e. inhibiting the delivery of the alerting signal, and an interrupted alert signal output. The alerting signal is delivered to the user by transducer 522.

Data messages that have been received over second communications channel 20 and stored in RAM A 226, as previously described, can be retrieved for review by actuating ADJ/READ switch 528. The messages are displayed on LCD display 230 which corresponds to presentation means 230 of FIG. 2. When a message is displayed, timer counter 516 is set to a time interval, such as eight seconds, during which the displayed message may be viewed. Upon completion of the eight second interval, the time would again be displayed. If the user requires a longer time interval to view the message, MODE/HOLD switch 526 can be actuated indefinitely freezing the display until MODE/HOLD switch 526 is again actuated.

As previously described, RAM A 226 stores the received messages. In the preferred embodiment of the present invention, only the most current message is stored and viewable in the manner just described. It will be appreciated by those skilled in the art, that multiple messages can be stored as well, and recalled for display individually using multiple actuations of ADJ/Read switch 528.

Also connected to I/O port 502 is real-time clock (RTC) 234, such as the MC146818, manufactured by Motorola, provides all the timing functions for the presentation unit. RTC 234 corresponds to time generating means 234 of FIG. 2. When messages are not being displayed, CPU 504 controls the display of time information, such as day and date, on LCD display 230. SET switch 524 allows the time information to be set, or changed. MODE/HOLD switch 526 selects which time information is to be changed, such as hours, minutes, day or date information. ADJ/READ switch 528 allows the information selected by MODE/HOLD switch 526 to be incremented until the desired information is displayed.

Reference is now directed to FIG. 6 which shows a pictorial view of the wrist worn presentation unit 600 corresponding to the presentation unit 22 of FIG. 1. As shown, presentation unit 600 consists of a housing 602 which may be attached to the wrist by a wristband or strap (not shown). Housing 602 is constructed using methods and materials well known to one skilled in the art, such as injection molded plastic, although other materials may be used equally as well. Access to the electronics is through a metal cover (not shown), such as plated sheet-metal or stainless steel attached by screws (not shown) or other suitable fasteners to housing 602.

A display area 604 is provided for viewing either a time or message display. FIG. 6 particularly shows a message display 612 consisting of two lines, one of which displays an area code, and one of which displays the phone number. It will be appreciated by those skilled in the art that all the displayed information may be placed on a single line, or that multiple lines of information may be provided allowing for the display of longer messages which may also include alphanumeric information. Message number indicator 622 provides a visual indication of the message currently being displayed. This number corresponds to the message number stored in the pager memory 212. Depending upon the size of the memory in the presentation unit as compared to the pager, this number could correspond to the message number as stored in the presentation unit as well.

Switches 606, 608 and 610 provide control of the time and message display functions. Annunciators 614, 616, 618 and 620 are provided which indicate the status of the various functions provided by presentation unit 600, in addition to the time or message display 612. A detailed description of the time and message display functions and annunciators will be provided shortly.

The display used in presentation unit 600 is preferably an LCD display which provides low current operation and allows convenient time, message and annunciator displays. As with similar wrist worn devices, a light function may be provided for viewing the display in the dark.

Reference is now directed to FIG. 7 which describes the annunciator functions. As previously described, each annunciator actually consists of several graphic indicators, i.e. a bar and a triangle. It will be appreciated that other forms of the indicators, such as other graphics or text, may be used without departing from the scope or spirit of the present invention.

When the presentation unit is synchronized with the pager, triangular CHANNEL indicator 614 is visible, as shown in FIG. 7 for Sync On. It will be appreciated that pager 16 may be turned off during normal operation, as might happen when the user turns the pager off each evening; or the battery in the pager becomes discharged to the point where the transmitter no longer transmits the synchronization signal; or the output of the transmitter may be corrupted by an extraneous signal, preventing the presentation unit from detecting the synchronization signal. When any of these events happen, the presentation unit continues to look for the synchronization signal to which it was previously synchronized for a period of time. If after a number of attempts to detect the synchronization signal, such as two attempts, the controller stops searching for sync, and triangular CHANNEL indicator 614 will begin to flash as indicated in FIG. 7. The user is also audibly alerted of the loss of synchronization by a short chirp being generated and delivered by annunciator 232. It will be appreciated by one skilled in the art that the audible chirp could be periodically generated for a period of time so as to insure the user is aware of the loss of synchronization. The time interval could correspond to the normal synchronization interval of sixty seconds, and may be repeated a number of times, such as three times.

When synchronization is lost, the user must place the presentation unit in the channel acquisition mode, as will be described shortly, to regain synchronization. The channel acquisition mode is indicated by bar CHANNEL indicator 616 being visible in addition to triangular CHANNEL indicator 614, as shown in FIG. 7. Within a short period of time, less than ten seconds, only the triangular CHANNEL indicator 614 will remain visible, indicating synchronization has been successfully completed.

If the user turned off his pager, flashing triangular CHANNEL indicator 614 would act as a reminder to initiate synchronization with the pager, the next time the pager is turned back on. Until then, the presentation unit operates as a conventional watch, including an alarm feature.

As indicated in FIG. 7, the alarm annunciator operates in a manner well known to those skilled in the art. When the alarm function is not selected, neither alarm indicator 618 or 620 is visible. When the bar alarm annunciator 620 is visible, the alarm is set.

Figure 8:
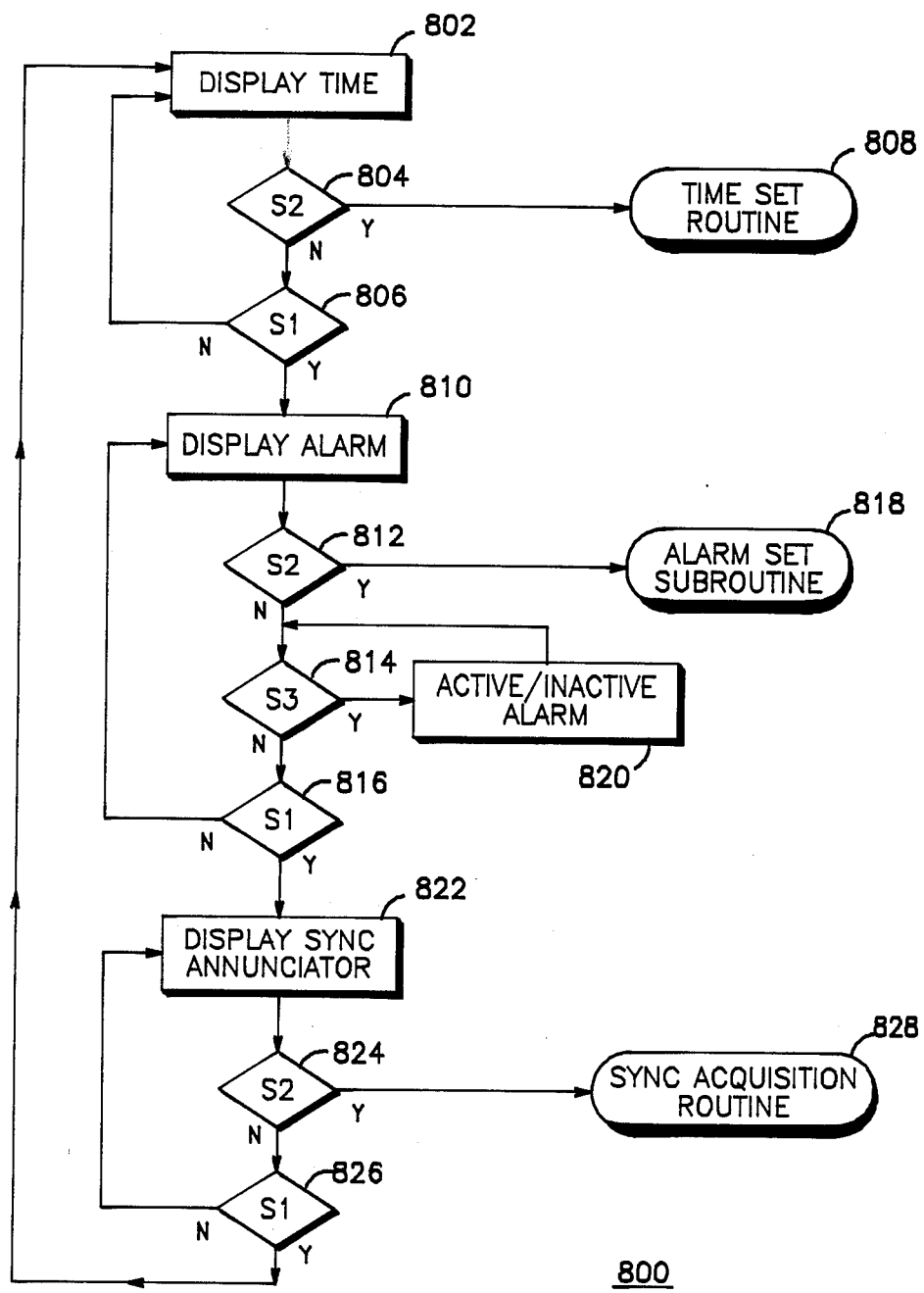
FIG. 8 is a flow chart describing the switch functions of the wrist worn presentation unit.

Reference is now directed to FIG. 8, which shows flow chart 800 indicating the functions controlled by switches 606, 608 and 610. Normally the presentation unit displays time, as shown at block 802. As long as switch S2, corresponding to Set switch 608 is not actuated, as shown at block 804, and switch S1, corresponding to Mode/Hold switch 606 is not actuated, as shown at block 806, time information remains on the display. Actuating switch S2 608, as shown at block 804, places the presentation unit in the time setting routine, as shown at block 808, which provides conventional multiple switch time setting functions. The use of multiple switches to adjust the time of a watch are well known to one skilled in the art. Actuating switch S1 606, as shown at block 806, while the time is being displayed or after the time has been set will cause the alarm time to be displayed, as shown at block 810. Actuating switch S2 608, as shown at block 812, advances the presentation unit to the alarm setting routine, as shown at block 818, which provides conventional multiple switch alarm time setting functions. The use of multiple switches to adjust the alarm time for a watch are well known to one skilled in the art. When alarm set routine, as shown at block 818, is entered, the triangular ALARM indicator 618 becomes visible Actuating switch S3 610, as shown at block 814, activates the alarm, as shown at block 820, and causes the bar ALARM indicator 620 to become visible. Actuating switch S3 610, as shown at block 814, a second time after the alarm has been activated, causes the alarm to be deactivated, as shown at block 820. Actuating switch S1, as shown at block 816, while the alarm time is being displayed or after the alarm time has been set, or activated, will cause the bar CHANNEL indicator 616 to become visible, as shown at block 822. Actuating switch S2 608, as shown at block 824, advances the presentation unit to the channel acquisition routine, as shown at block 828. The channel acquisition routine will be described in detail with FIG. 9. Actuating switch S1, as shown at block 826, returns the presentation unit to the normal time display mode, as shown at block 802.

Figure 9:
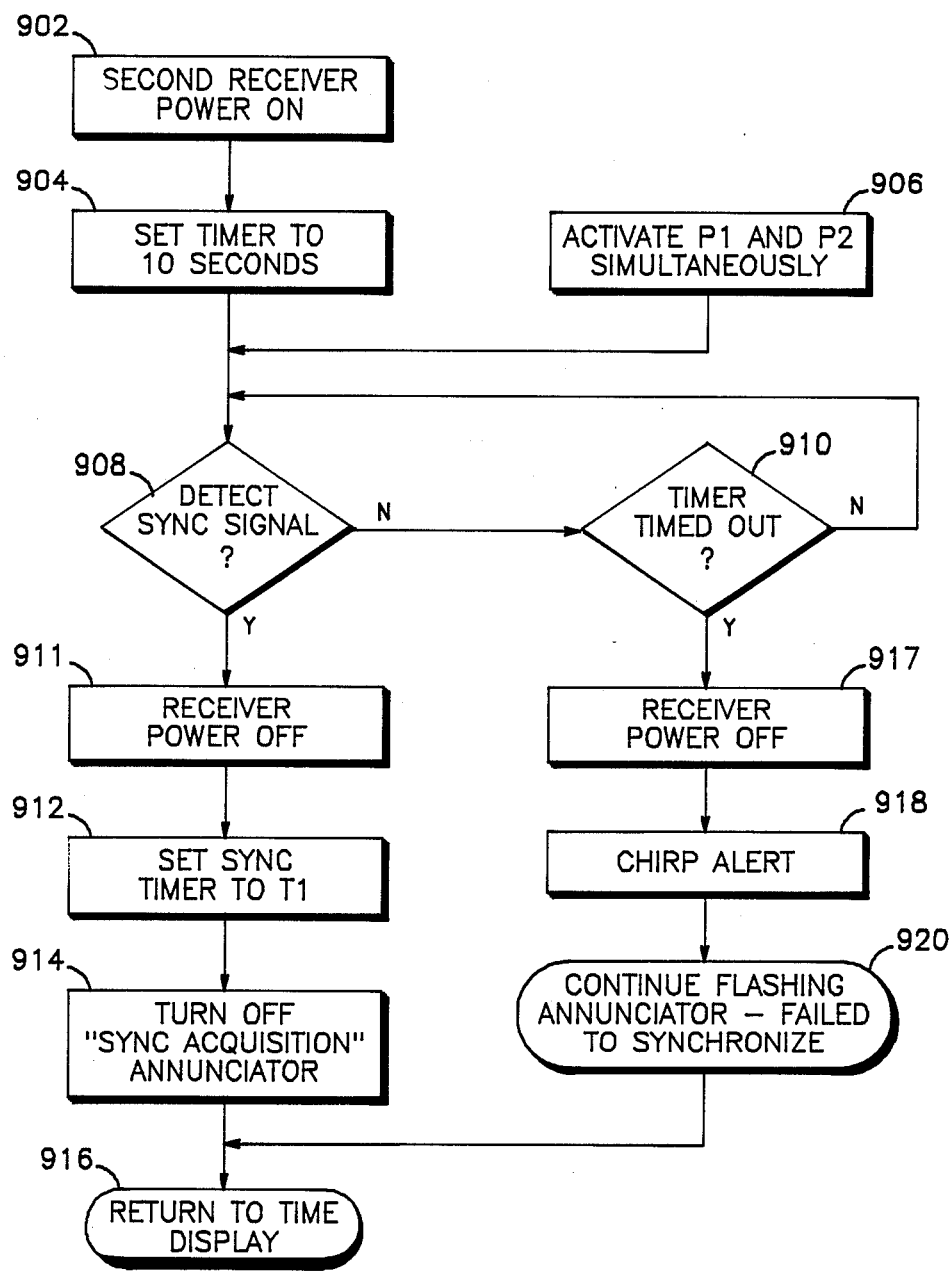
FIG. 9 is a flow chart describing the channel acquisition mode used in the preferred embodiment of the present invention.

Reference is now directed to FIG. 9, which shows flow chart 900 indicating the channel acquisition mode. When the user has entered the channel acquisition mode as previously described in FIG. 8, synchronization means 236 supplies power to receiver 222 (as shown in FIG. 5) continuously, as shown at block 902. Timer/counter 516 is set to a time interval, such as ten seconds, as shown at block 904, which is long enough for the user to actuate and hold RESET (P1) switch 454 and actuate TRANSMIT (P2) switch 452, as shown at block 906. A synchronization signal is then transmitted over the second communications channel, which when detected, as shown at block 908, suspends power to the receiver, as shown at block 911, and resets timer/counter 516 to the sync interval time T1 of sixty seconds, establishing the sync timer, as shown at block 912. The bar CHANNEL indicator 616 is turned off and the triangular CHANNEL indicator stops flashing, as shown at block 914, and the unit returns to the time display, as shown at block 916, completing the resynchronization of the two units.

If the synchronization signal is not detected, as shown at block 908, within the ten seconds time interval, as shown at block 910, power to the receiver is suspended, as shown at block 917, and an audible chirp is generated, as shown at block 918, indicating the two units failed to synchronize. Triangular CHANNEL indicator will continue to flash as shown at block 922, and the unit will return to the time display, as shown at block 916. The user must reenter the channel acquisition mode, as previously described, to again attempt to resynchronize the two units.

An apparatus comprising a belt or pocket worn unit and a wrist worn presentation unit has been described. The belt or pocket worn unit operates on a first, or conventional, communications channel and provides excellent receiver sensitivity, reliable message reception, and good battery life. Messages received by the belt or pocket worn unit are stored within the unit and then retransmitted on a second communications channel to a wrist worn presentation unit. When received, the message is stored within the wrist worn unit where it is conveniently displayed. Annunciators in the belt or pocket worn unit and/or the wrist worn presentation unit alert the user of a received message. Switches are provided on the units which allow resetting of the alerts on either or both of the units, retransmission of previously received messages from the belt or pocket worn unit to the wrist worn presentation unit, and review of messages currently stored in the wrist worn presentation unit.

While the description provided has been primarily focused on a simplex transmission between the belt worn unit and the wrist worn presentation unit, it will be appreciated that additional benefit can be obtained if a duplex transmission channel is provided for the second communications channel. A duplex operation is easily achieved by replacing transmitter 218 as shown in FIGS. 2 and 4 with a transceiver and replacing the second receiver section 222 also with a transceiver.

When duplex channel operation is provided, transmissions from the belt worn unit to the wrist worn presentation unit provide data messages, while transmissions from the wrist worn presentation unit to the belt worn unit are for control, such as channel acquisition, and recall of previously received messages, just to name a few. The reliability of communications between the belt worn unit and the wrist worn unit can also greatly be improved as messages received in error by the wrist worn unit can be corrected by an automatic request to retransmit the message. Also, such issues as the time delay encountered in transmitting a previously received message from the belt worn unit to the wrist worn presentation unit can be eliminated as the receiver in the presentation unit can be immediately energized without interrupting the previously described synchronization cycles.

With duplex operation, the belt worn unit no longer need be accessible to the user. It can now be worn in a pocket or placed in a purse with only the wrist worn presentation unit being visible. No one need know the user has complete communications as the "pager" is no longer visible.

We claim:

1. A personal message receiving apparatus, for presenting to a user selective call messages, having selective call address and message information, being transmitted on a first radio frequency communications channel, said device comprising:

a portable communications receiver intended to be carried by the user, said receiver having, a first receiver portion for receiving and detecting the selective call address and messages information being transmitted on the first radio frequency communications channel, message storage means responsive to the detected selective call address information for effecting the storing of the received message information, and transmitter means, coupled to said message storage means, and further responsive to the message information being stored for subsequently transmitting on a second communications channel, the stored message information; and a presentation unit further intended to be carried by the user, said unit having a second receiver means, separate from said portable communications receiver, for receiving and detecting the message information transmitted on the second communications channel, and presentation means, coupled to said second receiver means, for presenting the message information received on the second communications channel.

2. The personal message receiving apparatus, according to claim 1 wherein said second receiver means is intended to be worn on the wrist.

3. The personal message receiving apparatus, according to claim 1 wherein said message storage means is capable of storing a plurality of messages.

4. The personal message receiving apparatus, according to claim 1 wherein said message storage means comprises:

identification means storing a predetermined identification address;

a first memory for storing message information and storage controller means, coupled to said first receiver section and to said identification means, and further coupled to said first memory, for controlling the storage of the received message information in said first memory when the received selective call address matches the predetermined identification address.

5. The personal message receiving apparatus, according to claim 4 wherein said storage controller means further controls the subsequent transmission of the stored message information by said transmitter means after the message has been stored.

6. The personal message receiving apparatus, according to claim 4 wherein said first receiver means further comprises:

annunciator means, responsive to said storage controller means, for generating a sensible alerting signal after the message information is stored; and reset means, coupled to said storage controller means, for suspending the generation of the sensible alerting signal.

7. The personal message receiving apparatus, according to claim 6 wherein the sensible alerting signal is audible.

8. The personal message receiving apparatus, according to claim 6 wherein said reset means is a manually actuatable switch.

9. The personal message receiving apparatus, according to claim 4 wherein said first receiver means further comprises switch means, coupled to said storage controller means, for manually selecting a retransmission of the stored message information on the second communications channel.

10. The personal message receiving apparatus, according to claim 4 wherein said transmitting means generates a carrier signal and modulates the carrier signal with the stored message.

11. The personal message receiving apparatus, according to claim 10 wherein said carrier signal is ultrasonic radiation.

12. The personal message receiving apparatus, according to claim 10 wherein said carrier signal is infrared radiation.

13. The personal message receiving apparatus, according to claim 10 wherein said carrier signal is radio frequency radiation.

14. The personal message receiving apparatus, according to claim 1 wherein said second receiver means comprises:

a second receiver section for receiving and detecting the messages being transmitted on the second communications channel; and second controller means, coupled to said second receiver section and to said presentation means, for controlling the presentation of the message received on the second communications channel.

15. The personal message receiving apparatus, according to claim 13 wherein said second receiver means further comprises:

second annunciator means, responsive to said second controller means, for generating a sensible alerting signal after the message information is received on the second communications channel; and second reset means, coupled to said second controller means, for suspending the generation of the sensible alerting signal.

16. The personal message receiving apparatus, according to claim 15 wherein the sensible alerting signal is audible.

17. The personal message receiving apparatus, according to claim 15 wherein said second reset means is a manually actuatable switch.

18. The personal message receiving apparatus, according to claim 14 wherein said second receiver means further comprises a second memory, coupled to said second controller means, for storing the message information received on the second communications channel.

19. The personal message receiving apparatus, according to claim 18 wherein said second memory is capable of storing a plurality of messages.

20. The personal message receiving apparatus, according to claim 18 further comprising second switch means, coupled to said second controller means, for selecting the presentation of the stored message information.

21. The personal message receiving apparatus, according to claim 15 wherein in said second receiver means further comprises means for generating time signals coupled to said second controller means, and wherein said second controller means being responsive to said time generating means for selectively presenting the time signals when message information is not presented.

22. The personal message receiving apparatus, according to claim 21 wherein the presentation of time and message information is visual.

23. A personal message receiving apparatus, for presenting to a user selective call messages, having selective call address and message information, being transmitted on a first radio frequency communications channel, said apparatus comprising:

a portable communications receiver intended to be carried by the user, said receiver having, a first receiver portion for receiving and detecting the selective call address and message information being transmitted on the first radio frequency communications channel, message storage means responsive to the detected selective call address information for effecting the storing of the received message information, and first transceiver means, coupled to said message storage means, and further responsive to the message information being stored for subsequently transmitting on a second communication channel, the stored message information and for receiving control information;

a presentation unit further intended to be carried by the user, said unit having second transceiver means, separate from said portable communications receiver, for receiving and detecting the message information transmitted on the second communications channel and for transmitting control information; and presentation means, coupled to said second receiver means, for presenting the message information received on the second communications channel.

24. The personal message receiving apparatus, according to claim 23, wherein said message storage means is capable of storing a plurality of messages.

25. The personal message receiving apparatus, according to claim 23, wherein the message transmitted on the first communications channel includes a selective call address and message information, and wherein said message means further comprises:

identification means storing a predetermined identification address; and a first memory for storing message information; and storage controller means, coupled to said first receiver section and to said identification means, and further coupled to said first memory, for controlling the storage of the received message information in said first memory when the received selective call address matches the predetermined identification address.

26. The personal message receiving apparatus, according to claim 25 wherein said storage controller means further controls the subsequent transmission of the stored message information by said first transceiver means after the message has been stored.

27. The personal message receiving apparatus, according to claim 25 wherein said transceiver means generates a carrier signal and modulates the carrier signal with the stored message.

28. The personal message receiving apparatus, according to claim 27 wherein said carrier signal is ultrasonic radiation.

29. The personal message receiving apparatus, according to claim 27 wherein said carrier signal is infrared radiation.

30. The personal message receiving apparatus, according to claim 27 wherein said carrier signal is radio frequency radiation.

31. The personal message receiving apparatus, according to claim 23 wherein said second transceiver means comprises:

a second receiver section for receiving and detecting messages being transmitted on the second communications channel;

second controller means, coupled to said second receiver section and to said presentation means, for controlling the presentation of the message received on the second communications channel; and a second transmitter section, coupled to said second controller means for transmitting control information.

32. The personal message receiving apparatus, according to claim 31 wherein said second transceiving means further comprises:

annunciator means, responsive to said second controller means, for generating a sensible alerting signal after the message information is received on the second communications channel; and reset means, coupled to said second controller means, for suspending the generation of the sensible alerting signal.

33. The personal message receiving apparatus, according to claim 32 wherein the sensible alerting signal is audible.

34. The personal message receiving apparatus, according to claim 32 wherein said second reset means is a manually actuatable switch.

35. The personal message receiving apparatus, according to claim 31 wherein said second transceiver means further comprises a second memory, coupled to said second controller means, for storing the message information received on the second communications channel.

36. The personal message receiving apparatus, according to claim 35 further comprising switch means, coupled to said second controller means, for selecting the presentation of the stored message information.

37. The personal message receiving apparatus, according to claim 31 wherein said second transceiver means further comprises switch means, coupled to said second controller means, for manually selecting a retransmission of the stored message information on the second communications channel.

38. The personal message receiving apparatus, according to claim 32 wherein said second transceiver means further comprises means for generating time signals coupled to said second controller means, and wherein said second controller means being responsive to said time generating means for selectively presenting the time signals when message information is not presented.

39. The personal message receiving apparatus, according to claim 38 wherein the presentation of time and message information is visual.

40. The personal message receiving apparatus, according to claim 23 wherein said second transceiver means is intended to be worn on the wrist.

* * * * *